Jan. 12, 1960
E. F. HEMBROOKE
2,921,291
AUTOMATIC CONTROL CIRCUIT
Filed March 9, 1955
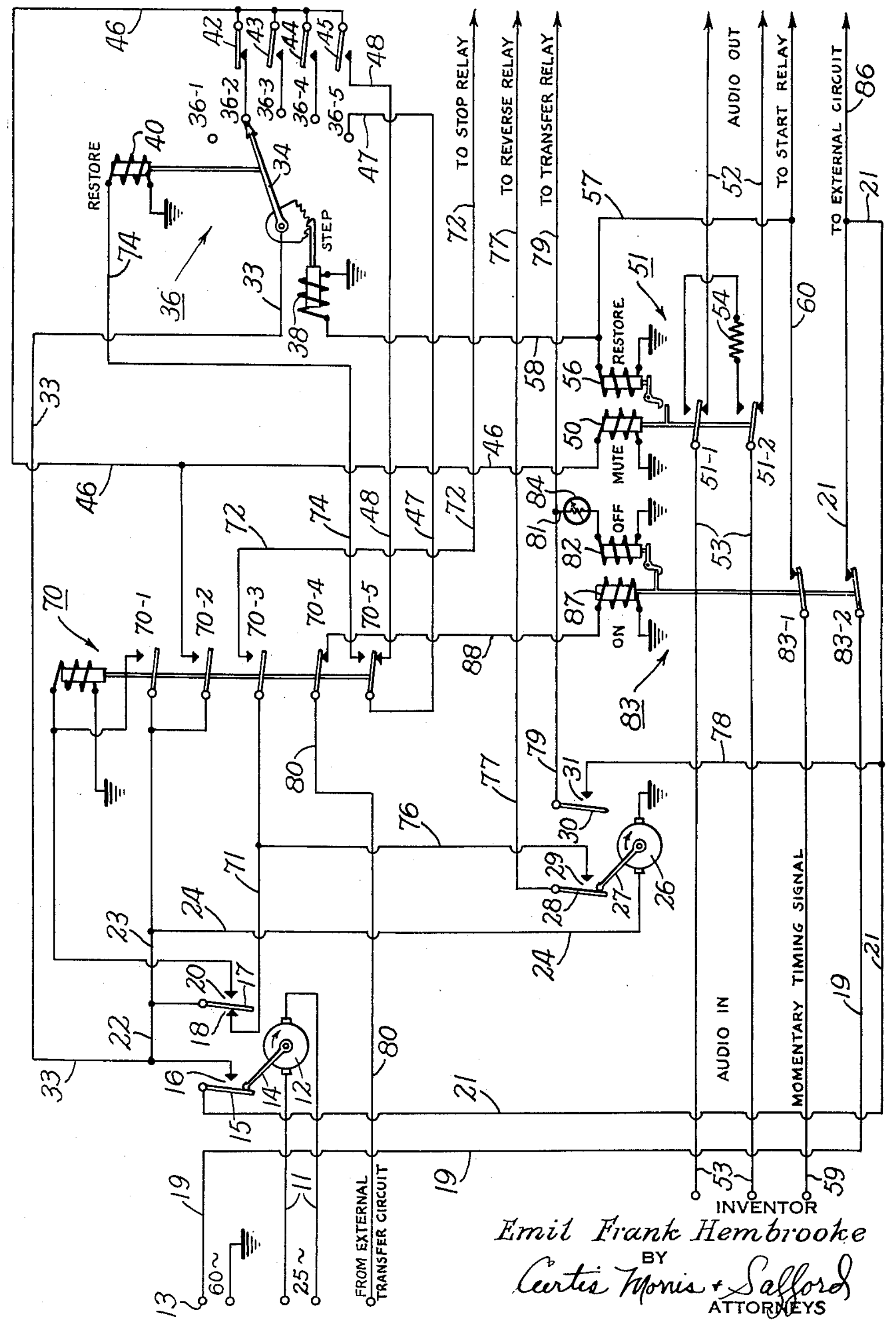
INVENTOR
Emil Frank Hembrooke
BY
Curtis, Morris & Safford
ATTORNEYS United States Patent Office 2,921,291

Patented Jan. 12, 1960

2,921,291

AUTOMATIC CONTROL CIRCUIT

Emil Frank Hembrooke, Brooklyn, N.Y., assignor to Muzak Corporation, New York, N.Y., a corporation of New York Application March 9, 1955, Serial No. 493,282

11 Claims. (Cl. 340—167)

This invention pertains to the automatic operation of a particular one of a plurality of separate circuits by means of a control signal whose duration determines the circuit to be operated and whose presence is dependent upon the non-operation of at least one of these circuits. The invention is particularly adapted to the automatic control of signal reproducing systems such as machines for reproducing dual track magnetic tape records for music and the like wherein control is to be effected by an inaudible signal, i.e. a signal which will not be heard by a listener under normal playback conditions, recorded along with the music.

In the wired or radio broadcasting of musical programs, as in the system known by the trademark "Muzak," the broadcast is divided into 15-minute programs beginning promptly on a quarter-hour. Each program may consist, for example, of a number of short selections whose total playing time is approximately 13½ minutes. Shortly before each quarter-hour but not before the end of the last selection in a particular program, the music reproducing machine is stopped and conditioned so that broadcasting can be resumed promptly on the quarter-hour. At the proper time, the reproducing machine (either the one that was just stopped or a second machine in the event the record on the first is completely played) is started and allowed to run for the next program, and so on.

Until recently the starting and stopping of the reproducing machines employed in this system was done manually by a full-time operator. Accordingly, the operating cost of this music service was high and this restricted its commercial application to localities where a large number of subscribers could be served by a single distribution center, as in large cities.

To overcome this disadvantage, an automatic apparatus for starting, stopping and for switching from one reproducing machine to another has been developed. This apparatus is disclosed and claimed in co-pending application Serial No. 343,960, filed March 23, 1953, now Patent No. 2,802,060, August 6, 1957. The present invention, in one of its aspects, provides an improved apparatus of this kind.

In addition to controlling the running of the reproducing machines, it is desirable to be able to mute one or more of the individual selections played during a program. A reason for this is that the records used in broadcasting are most economically duplicated from a single master set of records containing a variety of musical selections and thereafter distributed nationally regardless of whether or not all of these selections are popular in each section of the country. The present invention, in another of its aspects, therefore provides for the automatic muting of one or more of the selections played during each 15-minute program.

A specific illustration of the advantage of such muting might be when a Christmas greeting is recorded in the end portion of the first 15-minute program of an hour's broadcast, a New Years greeting in the end of the second 15-minute program, a Valentine greeting in the end of the third, and an Easter greeting in the end of the fourth, and that such greetings are recorded in the same sequence in succeeding hours of the program. Naturally, at a given time of the year not all these greetings are appropriate, so it is obviously desirable to have some provision for muting those not wanted. In the hereinafter described illustrative embodiment of the invention, muting of the end portion of any one or more 15-minute programs of an hour's broadcast, and of succeeding hours in the same order, can be obtained if desired. It is to be understood however that the invention is not limited solely to muting the end portions of 15-minute programs, but that this is done merely for convenience because by muting the end portion of a program no additional provision for conditioning the embodiment to play the next 15-minute program is necessary, this being accomplished automatically by the control which initiates the next program. Moreover, it is to be understood that the sequence of muting can be varied as required.

Another factor which must be dealt with herein is that in the interest of economy, and in this kind of broadcasting especially, where a control signal is recorded on the same record but must not interfere with the program being presented, it is desirable to use a single frequency control signal which lies outside the frequency band of the program. Moreover, to give positive control and freedom from interference by spurious signals such as record noise and the like and for simplicity, the signal is preferably a single relatively long pulse whose duration determines the operation to be carried out by the control apparatus. These requirements are complicated by the fact that at times the control signal must stop the reproducing machine and thereby automatically extinguish itself but at other times it must initiate some other operation instead.

In accordance with the present invention and in one specific embodiment thereof, an apparatus is provided which is able to accept a single pulse control-signal having a frequency outside the usual broadcast frequency band and to operate a selected one or a combination of four separate switches depending upon the duration of the control signal. The embodiment illustrated herein is described in connection with machines for reproducing dual-track tape recordings and the four separate switches to be controlled automatically are a "muting" switch in the audio distribution line, the "stop" switch of one reproducing machine, the "reverse" switch of the same machine and a "transfer" switch for actuating a second machine when the playing time of the first has expired. An independent signal source is used to give a momentary starting signal at each quarter hour but special interlocking switches operated in conjunction with the transfer switch are provided to prevent a starting signal from reaching a machine whose playing time has ended. The control signals used have a three second duration for "mute," an eight second duration for "stop," a sixteen second duration for "reverse," or a twenty-five second duration for "transfer." To prevent self-extinguishing of this control signal in the event it lasts eight seconds or longer to thus produce automatic stopping, a special interlocking arrangement is provided to actuate the stop relay only at the end of a control signal pulse of predetermined duration. The above ends are accomplished in the embodiment described herein by an interconnected array of mechanical relays and timing motors. No vacuum tubes are needed in this specific control circuit with the results that it requires no energization when not actually performing its control function and that it is rugged and trouble free.

The accompanying drawing is a schematic circuit diagram of an automatic control apparatus embodying features of the present invention.

In this diagram, all input signals are applied at the left, and all output signals are taken from the right and applied to appropriate points in the broadcasting system, either to the reproducing machines or to the audio distribution lines, none of which is shown. The control signal (here a 25-cycle tone) recorded along with the music program is therefore derived as part of the output of a reproducing machine and is compiled and connected through leads 11 to a 25-cycle timing motor 12. If desired the higher frequencies of the audio band may be separated out in any convenient way from this signal, for example, by means of the filter shown in the above-mentioned copending application. However, since they do not affect the motor 12, they need not be removed at all.

When a 25-cycle A.C. voltage of sufficient amplitude appears across leads 11, motor 12 starts from the position shown and continues to run so long as this voltage continues. One second after the motor starts, a paddle 14, which is rotated by the motor through an internal gear train, is moved far enough clockwise, i.e., in the direction of the arrow, to release an arm 15 of the switch 16 and thereby to permit closure of switch 16 which is normally spring urged toward closed position. Six seconds after motor 12 starts, paddle 14, which in the meantime has been rotating clockwise, contacts an arm 17 of the switches 18 and 20, thereby opening switch 18 and closing switch 20. Further running of the motor 12 merely holds paddle 14 against arm 17 and keeps these switches 18 and 20 in their opened and closed positions, respectively.

When the 25-cycle tone across leads 11 stops, motor 12 stops and paddle 14 is quickly but not instantaneously rotated counterclockwise to the position shown by a resetting mechanism within the motor. As a result, switch 20 opens before switch 18 closes, and switch 18 closes before switch 16 opens.

Upon the closing of switch 16, the ungrounded side of the 60-cycle power line (not shown) is connected through terminal 13 at the upper left of the circuit via leads 19, switch 83–2 (when not open) of an interlocking relay generally indicated at 83, and leads 21, 22, 23 and 24 to the ungrounded side of a 60-cycle motor 26 which is thereupon started from the position shown. In a way analogous to motor 12, after 60-cycle motor 26 has run eleven seconds (i.e. twelve seconds after 25-cycle motor 12 started) its paddle 27 moves clockwise away from the arm 28 of switch 29. After motor 26 has run nineteen seconds, paddle 27 moves against an arm 30 thereby closing switch 31. When 60-cycle motor 26 is deenergized, a reset mechanism returns paddle 27 to its starting position quickly but not instantaneously, during which movement switch 31 opens before switch 29 opens.

Each time a 25-cycle tone of one second or longer duration is applied to leads 11, switch 16 closes and, provided switch 83–2 of interlocking relay 83 is closed, applies a voltage via lead 33 to the rotating arm 34 of a stepping relay, generally indicated at 36. Arm 34 may occupy any one of five contact positions numbered 36–1 through 36–5. It is advanced each time in a clockwise direction from one position to the next by a voltage momentarily applied to the step coil 38 of the relay. After it reaches position 36–5 it is returned to position 36–1 by a voltage applied to the reset coil 40. Each of contacts 36–2 through 36–4 is connected through one of the switches 42 through 45, respectively, to a lead 46. Contact 36–5 is connected to this lead 46 via lead 47 through the normally closed contacts of switching section 70–5 of an intermediate relay, generally indicated at 70, via lead 48 and through switch 45.

Each of switches 42 through 45 can be set open or closed independently of the others. By closing all four, for example, the undesired selections at the end of the four programs in each hour's broadcast will be muted. Any other desired sequence of muting is, of course, possible. Since those selections which may or may not be muted, as desired, are placed in the last part of each 15-minute program of the broadcast, it is not necessary, as was mentioned previously, in this circuit to restore the muting relay before the beginning of the next program.

For the circuit conditioned as shown here, when a 3-second mute tone occurs, switch 16 will be closed and, since switch 42 is closed, voltage is applied through contact 36–2 of stepping relay 36 via lead 46 to the mute coil 50 of a muting relay, generally indicated at 51. It is of course evident that any tone longer than 3 seconds will also bring about this same result. The energization of coil 50 causes switches 51–1 and 51–2 of relay 51 to move up from the position shown to disconnect the audio output leads 52 from the audio input leads 53 and to connect the latter across a dummy load resistor 54. Switches 51–1 and 51–2 of relay 51 latch in this position and remain latched after coil 50 is energized and until the restore coil 56 of the relay is later energized to unlatch them. Switches 18 and 20 of the timing motor 12, it should be remembered, are not operated by a mute tone.

The restoring voltage for muting relay 51 together with the stepping voltage for stepping relay 36 is supplied via leads 57 and 58, respectively, through switch 83–1 of the interlocking relay 83 from a timing signal source (not shown) which, at the beginning of each quarter hour, applies at the left of the circuit, a momentary voltage to lead 59. When this voltage is applied to leads 57 and 58, it is also applied via lead 60 to the start relay (not shown) of a reproducing machine.

After the last selection of a program portion has been played (some 13½ minutes or so after that portion began), an 8-second, 25-cycle stop tone, also recorded directly on the record being played, is applied to leads 11. This drives 25-cycle motor 12 and in one second closes switch 16 and in six seconds opens switch 18 and closes switch 20. When switch 20 closes, the intermediate relay, generally indicated at 70, is energized and its switches are pulled up from the position shown, closing the normally open switches 70–1, 70–2 and 70–3, opening the normally closed switch 70–4 and reversing the single pole double-throw switch 70–5. Switch 70–1 is in parallel with switch 20 and, when relay 70 is energized, it will stay energized until switch 16 is opened even though switch 20 is opened in the meantime. The closing of switch 70–2 of relay 70 acts to mute the broadcast output (if it is not already muted) to eliminate any switching noises or effects that may occur.

After the end of the 8-second stop tone, 25-cycle motor 12 and paddle 14 are returned to their starting positions (in which they are shown) opening switch 20, closing switch 18 and finally opening switch 16. However, in the interval between the opening of switch 20 and the opening of switch 16, power line voltage is connected via lead 19, switch 83–2, lead 21, switch 16, lead 22, switch 18, lead 71, switch 70–3 (which is closed) and lead 72 to a stop relay (not shown) which thereupon acts to stop the reproducing machine.

Thus this stop relay is operated only after the end of a stop tone (or one which is longer) thereby preventing such a tone from extinguishing itself by stopping the reproducing machine before the end of the tone is reached on the record being played.

In the short interval that the reproducing machine is stopped before the next quarter-hour (approximately one minute) the parts of the control apparatus occupy the positions shown in the drawing except that the muting relay 51 is latched up and the dummy load 54, instead of audio output leads 52, is connected across the audio input leads 53.

Since the last control signal applied to leads 11 was an 8-second stop tone rather than a longer reverse or transfer tone, the reproducing machine just stopped still has additional playing time in the forward direction. Promptly on the quarter-hour, therefore, a momentary voltage is applied via lead 59 and lead 60 to the start relay (not shown) of this machine. The same voltage is also applied at the same time to the step coil 38 of stepping relay 36 and the restore coil 56 of muting relay 51. Arm 34 of stepping relay 36 will be advanced clockwise one position, in this case from contact 36–2 to contact 36–3 and switches 51–1 and 51–2 of relay 51 will be moved down to the position shown.

The next program then begins and continues for something like eleven minutes until the next 3-second muting tone appears, this tone appearing just before those last few selections in the program which may be muted if desired. However, since arm 34 of stepping relay 36 is now in position 36–3, i.e. it has been advanced one step from its previous mute control position to a new one, and since switch 43 happens to be open, this muting tone will not operate muting relay 51 and the selections which follow will not be muted.

After the last selection in this portion is played, assuming there still remains forward playing time on the record, another 8-second stop tone is applied to leads 11 and the above described phase of stopping and starting is again repeated. The cycle of starting, muting if desired, and stopping continues in the manner described until the forward playing time of the record is exhausted.

Each time the reproducing machine is started, stepping relay 36 is advanced one position, thereby being conditioned for the next muting cycle, until ultimately arm 34 is moved from contact 36–4 to contact 36–5. Since leads 47 and 48, connecting contact 36–5 with one side of switch 45, are themselves connected together by switch 70–5 of intermediate relay 70, so long as this relay is not energized the next muting operation will be controlled by the setting of switch 45 in the same way the previous muting operation was controlled by switch 44. When intermediate relay 70 is now energized, its switch 70–5 is reversed and lead 47, which is thereupon connected to the power line at terminal 19 via arm 34 and switch 16, is connected to a lead 74. This lead 74 is connected to the reset coil 40 of stepping relay 36 which is thus energized, thereby returning arm 34 to contact 36–1 which is a blank position. Arm 34 stays at this contact until the beginning of the next 15-minute program when it is stepped to contact 36–2 by the momentary voltage applied to step coil 38 of the relay. Thus, reset of this relay occurs only when arm 34 is connected to contact 36–5.

When the forward playing time of the reproducing machine is exhausted, a 16-second reverse tone recorded on the record is used to reverse the machine. Preferably this reverse tone is placed on the record at a point where ordinarily a stop tone would be placed. Thus, the machine can be reversed at the same time it is stopped and thereby conditioned for starting on the quarter-hour and for proceeding in the reverse direction.

When the reverse tone appears across leads 11, 25-cycle motor 12 starts and in the manner previously described, closes switch 16, opens switch 18 and closes switch 20. The 60-cycle motor 26, which is energized upon the closing of switch 16, closes switch 29 some twelve seconds after the reverse tone begins. About four seconds after switch 29 closes, i.e. after the end of this tone, switch 20 opens and switch 18 closes. Switch 29 is still closed, though, and so power line voltage is applied via lead 19, switch 83–2, lead 21, switch 16, lead 22, switch 18, lead 71, lead 76, switch 29, and lead 77 to a reverse relay (not shown) which reverses the direction of tape travel in the reproducing machine. This same voltage is simultaneously applied to the stop relay via lead 72 through switch 70–3. The next timing signal applied to lead 59 therefore starts the reproducing machine in the reverse direction; it also resets the control circuit as explained previously.

When the tape record playing time of one machine becomes exhausted in both the forward and reverse directions, it is necessary to transfer to a second machine. This is accomplished by a transfer tone of twenty-five seconds' duration recorded at an appropriate place on the record, preferably where a stop tone would ordinarily occur.

After this transfer tone has continued a sufficient length of time, about twenty seconds, 60-cycle motor 26 closes switch 31. Switches 16, 18, 20, and 29 and intermediate relay 70 have already been actuated in the way explained above. When switch 31 closes, power line voltage is connected from lead 21 via lead 78, switch 31, and lead 79 to a transfer relay (not shown). This relay acts to switch program broadcasting from the machine about to be stopped to a second machine ready to be started. Lead 79 may run, for example, to a lead on a second control apparatus corresponding to the external transfer circuit lead 80 at the upper left of the circuit shown. In addition to applying voltage to the transfer relay, switch 31, after a short delay, also energizes via lead 79 and lead 81 the "off" coil 82 of interlocking relay 83. The short delay in the energization of "off" coil 82 after the application of voltage to lead 81 can be obtained in any convenient way, for example, by inserting a current delay device 84, such as a thermistor, in series with the coil. Providing this delay insures that the transfer relay on the machine being transferred to will be operated before voltage is removed from lead 79 by the opening of switch 83–2.

When coil 82 is energized, each of switches 83–1 and 83–2 of relay 83 is opened. The opening of switch 83–1 prevents a timing signal applied to lead 59 from reaching the start relay via lead 60, and from actuating relays 36 and 51 via leads 57 and 58. The opening of switch 83–2 disconnects the power line from the entire circuit by breaking the connection between leads 19 and 21. This also deenergizes an external circuit (not shown) which powers the audio amplifier and drive mechanism of the machine being stopped, this external circuit being connected to the power line through switch 83–2 and lead 86.

The switches on interlocking relay 83 will remain open after switch 31 opens and until the "on" coil 87 is energized via lead 80, normally closed switch 70–4 on relay 70, and lead 88 from an external circuit. Thus, once a transfer tone has actuated the control circuit shown, the circuit will remain disabled until a proper voltage is applied to lead 80. In the meantime a second reproducing machine will be operated, and the one now being transferred from can be supplied with a different record.

The end of the transducer tone would cause the energization of the stop relay via lead 72 and the energization of the reverse relay via lead 77, except for the fact that the power line has already been disconnected from the circuit by the opening of switch 83–2. This switch 83–2, it should be remembered, is opened shortly after the closing of switch 31 and before the end of a transfer tone. Thus the transfer tone causes the circuit to be disabled before the stop or reverse relays can be operated. However, since power has been removed from lead 86 to the external circuit (not shown), as explained previously, the result of operating the stop relay is in effect obtained. If desired, lead 21 can be disconnected from switch 83–2 and connected directly to lead 19. Then the circuit will not be disabled until after the end of a transfer tone, the ending of which will cause the energization of the stop and reverse relays in the way explained previously.

A short time before the beginning of a quarter-hour period, and after its corresponding reproducing machine has been reloaded, the circuit shown may be enabled by applying a proper voltage to lead 80. Since switch 70–4 is closed, this voltage will energize the "on" coil 87 of relay 83 thereby closing its switches 83–1 and 83–2.

Thereafter, a voltage applied to lead 59 will re-commence broadcasting from this machine and the circuit shown will operate cyclically in the manner described above.

It is to be understood that, although not specifically described herein, the various operations of this control apparatus can be initiated manually, instead of automatically by a signal tone, in a way analogous to that shown in the above mentioned co-pending application.

It is further to be understood that control apparatus in accordance with the present invention can be used for the control of the functions of recording machines and is not limited to use solely with reproducing machines.

The above description is intended as merely illustrative and not restrictive. Various changes and modifications in the embodiment shown may occur to those skilled in the art and these can be made without departing from the spirit or scope of the invention as set forth.

I claim:

1. A circuit for the automatic control of tape record machines in accordance with a control signal which may have any one of a plurality of different durations depending on the function of the machines to be initiated said circuit comprising: a source of power, a first switch normally open and connected to said source, a second switch connected in series with said first switch and normally closed, a third switch connected in series with said first switch and normally open, a first auxiliary switch normally open and connected in series with said first and second switches for controlling a first output circuit, said first auxiliary switch being closed when said third switch is closed and thereafter opened when said first switch is opened, and timing means actuated by the control signal and connected to close said first switch a short time after actuation and a longer time after actuation to open said second switch and to close said third switch, said second switch being openable and said third switch being closeable only when said first switch is closed and said first switch being openable only when said second switch is closed, whereby said first output circuit is actuated only after the end of a control signal lasting longer than a time sufficient to close said third switch.

2. The combination of elements as in claim 1 in further combination with stepping switch means in series with said first switch to control according to a predetermined sequence of settings of said stepping switch means a second output circuit upon the closings of said first switch.

3. The combination of elements as in claim 1 in further combination with a fourth switch normally open and connected in series with said first and second switches for controlling a third output circuit, and second timing means connected to close said fourth switch a short time after said second switch is opened and said third switch is closed, said fourth switch being closeable only when said first and third switches are closed and second switch is open and being openable only when aid first switch is open, whereby said third output circuit is actuated only after the end of a control signal lasting longer than a time sufficient for said fourth switch to close.

4. The combination of elements as in claim 3 in further combination with means actuated by said second timing means for controlling a fourth output circuit and for disabling said circuit arrangement to prevent further control thereof, said means being actuated by said second timing means only after said fourth switch has been closed.

5. The combination of elements as in claim 2 in which said stepping switch means in series with said first switch includes a plurality of switches which can be set either open or closed in predetermined sequence so that the closing of said first switch either controls or does not control said second output circuit depending upon the sequential setting of said switches.

6. A circuit arrangement for the automatic control of the functions of a tape reproducing machine or the like in accordance with a control signal which may have any one of a plurality of different durations depending upon the function to be initiated, the continued presence of the control signal being dependent upon the non-initiation of at least one function to be controlled, said arrangement comprising: a first switch normally open, a second switch double-throw having its common pole connected to said first switch and having a normal and an actuated position, a first timing means responsive to said control signals and connected to close said first switch a short time after the beginning of a control signal and if said signal continues, to actuate said second switch from normal to actuated position, a reset mechanism in conjunction with said first timing means to return said first and second switches to their normal positions after the end of a control signal, a third switch normally open and closed upon the actuation of said second switch and reopened only when said first switch is reopened, a first machine function control circuit controlled by said first, second and third switches in series upon the end of a control signal lasting longer than a first given time, a second machine function control circuit controlled by said first switch alone, a fourth switch normally open and connected in series with said first and second switches, a fifth switch normally open, second timing means responsive to said control signals and adapted to close said fourth switch a short time after said second switch is actuated and to close said fifth switch a short time after said fourth switch is closed, a reset mechanism in conjunction with said second timing means to return said fourth and fifth switches to their normal positions after the deenergization of said second motor, a third machine function control circuit adapted to be controlled by said first, second, and fourth switches in series upon the end of a control signal lasting longer than a second given time which is longer than said first given time, a fourth machine function control circuit adapted to be controlled by said fifth switch after the occurrence of a control signal lasting longer than a third given time which is longer than said second given time, and disabling means actuated by said fifth switch for preventing control of the functions of the machine after a control signal longer than said third given time and until enabling of said circuit arrangement by an external signal.

7. The combination of elements as in claim 6 in which said second machine function control circuit includes switch means which can be set either to prevent or permit the actuation of said second machine function control circuit in a desired sequence by the control signals.

8. The combination of elements as in claim 7 in which said switch means includes a stepping relay and a plurality of independent switches connected thereto each of which can be set open or closed according to the sequence of operation desired.

9. The combination of elements as in claim 8 in further combination with means for applying a periodic timing signal to said stepping relay and to said circuit arrangement and the machine to be controlled to initiate each cycle of operation.

10. A circuit to control according to the duration of a signal recorded on a record being played, the stop and the reverse functions of a machine for reproducing dual-track tape records, said circuit comprising first switch means energized by any signal longer than a first duration, second switch means energized by any signal longer than a second duration which is longer than said first duration, stop relay switch means pre-energized by said first and second switch means together but finally energized to stop said machine when said second switch means is de-energized, third switch means energized by any signal longer than a third duration which is longer than said second duration, and reversing means to reverse said machine and energizable by said first and third switch means together after said second switch means is de-energized.

11. The combination of elements as in claim 10 wherein said first switch means includes a plurality of switches for muting or not muting the recording played by said machine in accordance with a chosen one of a number of predetermined settings of said switches, and in further combination with advancing means for changing from one of said plurality of switches to another after each energization of said first switch means.

References Cited in the file of this patent

UNITED STATES PATENTS

| | | |
|---|---|---|
| 1,620,987 | Trenor | Mar. 15, 1927 |
| 2,051,369 | Durbin | Apr. 18, 1936 |
| 2,100,284 | Kriechbaum | Nov. 23, 1937 |